United States Patent
Galbraith et al.

(10) Patent No.: US 12,399,778 B2
(45) Date of Patent: Aug. 26, 2025

(54) CHANNEL CIRCUIT WITH ZERO FORCE EQUALIZER

(71) Applicant: Western Digital Technologies, Inc., San Jose, CA (US)

(72) Inventors: Richard Galbraith, Rochester, MN (US); Pradhan Bellam, Rochester, MN (US); Iouri Oboukhov, Rochester, MN (US); Niranjay Ravindran, Rochester, MN (US); Weldon Hanson, Rochester, MN (US); Jonas Goode, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 35 days.

(21) Appl. No.: 18/532,404

(22) Filed: Dec. 7, 2023

(65) Prior Publication Data
US 2025/0190307 A1    Jun. 12, 2025

(51) Int. Cl.
  *G06F 11/10*    (2006.01)
  *G06F 11/00*    (2006.01)

(52) U.S. Cl.
  CPC .......... *G06F 11/1076* (2013.01); *G06F 11/10* (2013.01)

(58) Field of Classification Search
  CPC ..... H04L 25/03057; H04L 2025/03624; H04L 25/03038; H04L 2025/03477; H04L 2025/0342; H04L 2025/03401; H04L 2025/0363; G06F 11/1076
  See application file for complete search history.

(56) References Cited

U.S. PATENT DOCUMENTS

| | | | |
|---|---|---|---|
| 6,381,085 B1 | 4/2002 | Du | |
| 6,760,371 B1* | 7/2004 | Bach | H04L 25/03038 375/232 |
| 6,937,650 B2* | 8/2005 | Coker | G11B 20/10046 375/232 |
| 7,848,471 B2* | 12/2010 | Hidaka | H04L 25/03057 375/232 |
| 7,982,985 B1 | 7/2011 | Chaichanavong | |
| 8,175,201 B2 | 5/2012 | Mathew | |
| 9,973,354 B1 | 5/2018 | Radich | |
| 10,069,653 B1 | 9/2018 | Derras | |
| 10,129,053 B2* | 11/2018 | Vidal | H04L 25/03133 |

(Continued)

OTHER PUBLICATIONS

Riani, "Contributions to Adaptive Equalization and Timing Recovery For Optical Storage Systems", Technische Universiteit Eindhoven, pp. 1-193, 2008.

(Continued)

*Primary Examiner* — Justin R Knapp
(74) *Attorney, Agent, or Firm* — Patent Law Works LLP (57) ABSTRACT

Example channel circuits, data storage devices, and methods for using zero force adaptation to equalize a read data signal based on known data are described. A known user data signal may be determined during prior read operations and used with a residue term from the equalized read data signal to adapt the tap weights for an equalizer filter using a zero force adaptation algorithm. For example, the known user data signal may be determined by a soft output detector (e.g., SOVA detector) or full or partial decoding by an iterative decoder (e.g., LDPC decoder) and fed back for adapting the equalizer.

21 Claims, 7 Drawing Sheets

(56) References Cited

U.S. PATENT DOCUMENTS

2004/0228397 A1 11/2004 Bach
2010/0061439 A1* 3/2010 Tomlinson ............... H04B 3/60
　　　　　　　　　　　　　　　　　　　　　375/232

OTHER PUBLICATIONS

Garrido, "Available Techniques for Magnetic Hard Disk Drive Read Channel Equalization", Instituto Universitário de Lisboa, pp. 1-13.

* cited by examiner

CHANNEL CIRCUIT WITH ZERO FORCE EQUALIZER

TECHNICAL FIELD

The present disclosure relates to read/write channel circuits for data storage devices. In particular, the present disclosure relates to read/write channels using a zero force equalizer for equalization of read data signals.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. The servo sectors comprise head positioning information (e.g., a track address) which is read by the head and processed by a servo control system to control the actuator arm as it seeks from track to track. The magnetic disk acts as a non-volatile storage medium for storing data.

Figure 1:
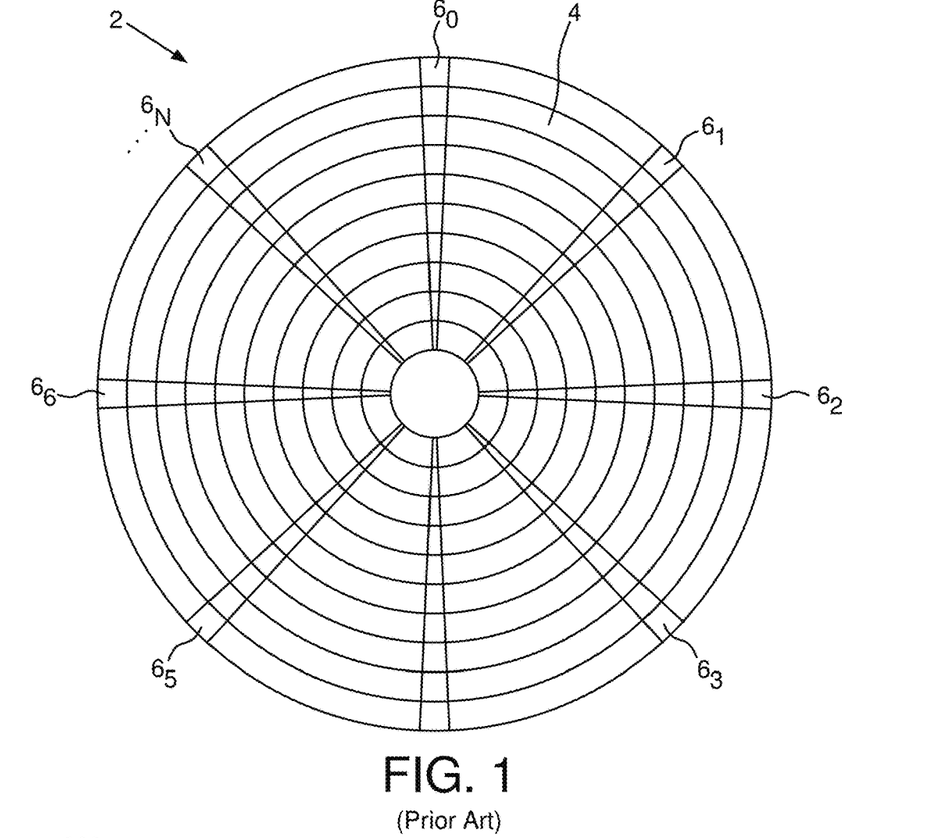
FIG. 1 is a diagram of a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector 6; further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations.

Figure 2:
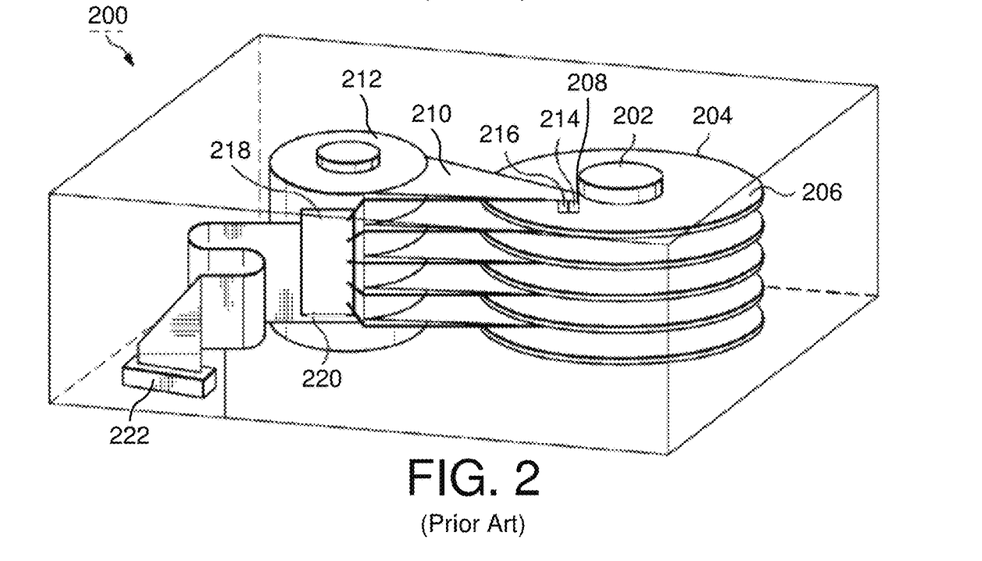
FIG. 2 is a diagram of an example data storage device in the form of a disk drive comprising heads actuated over disk surfaces.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212. A read element 214 may be configured to detect magnetized portions of magnetic surface 206 and generate an analog read signal. A write element 216 may be configured to generate a timed write field to write (or erase) magnetized portions of magnetic surface 206 using an analog write signal. In some configurations, head 208 may include more than one read element 214 and/or write element 216 and HDD 200 may include multiple heads 208, arms 210, and/or actuators 212. A preamplifier (preamp or preamplifier circuit) 218 controls the read and write signals to the corresponding read and write elements (e.g., read element 214 and write element 216) of each head (e.g., head 208). Preamplifier 218 may be attached to a flex circuit 220 that provides a data and power bus connection to a printed circuit board (not shown) with other drive control circuitry, such as a disk drive controller, through a flex interface connector 222.

The disk drive controller may include a read/write channel configured to receive an analog read signal from read element 214 through preamplifier 218 and flex circuit 220. The channel or channel circuit may convert the analog read signal to a digital read signal and perform iterative data detection and decoding to recover the data previously stored to disk surface 206. In some configurations, the channel may be configured to perform data detection and decoding on a plurality of data sectors corresponding to a data track. The channel may return detected data units corresponding to data bit representations in the analog read signal. These data units may be passed from the channel to a host interface. In some embodiments, the storage device controller may include a processor, memory, firmware, and other resources for receiving the data units from the channel, providing those data units to the host (with or without additional processing), and otherwise managing and coordinating the various storage device functions and subsystems.

The data channel may include various parameters for compensating for variations in read signals that impact data detection and decoding. For example, equalization of the read signal may enable the read channel to limit intersymbol interference (ISI) memory length in the signal and better define or sharpen the ISI in the signal. An optimal equalization target and equalizer filter may maximize the signal response while reducing the noise residue power and preventing noise residue correlations. Least-Mean-Square (LMS) is a common approach to partial response equalization, but may be prone to mis-equalization. Zero force equalization has also been attempted, but with computationally difficult and/or expensive implementations.

Technology for improved equalization of read data signals may be needed. A cost-effective implementation of a zero force equalization filter may be advantageous.

SUMMARY

Various aspects for channel circuits with zero force equalization using known data signals are described, particularly read channels configured to use a known data signal to adapt the equalization filter tap weights based on a zero force adaptation algorithm. In some configurations, a real-time adaptive gradient algorithm may implement zero force adaptation without matrix calculations using a known data signal derived from the read channel based on a lag for determining the known data. In some configurations, an equalization target, such as a 3-tap equalization target filter that uses measurements from a current equalization target to optimally whiten the composite noise at the output of the equalization circuit.

One general aspect includes a channel circuit that includes an equalizer filter and corresponding adjustment logic. The equalizer filter is configured to: receive a read data signal, filter the read data signal based on a set of adaptive tap weights, and output an equalized read data signal. The adjustment logic is configured to: receive a known user data signal and a residue data signal, and determine the set of adaptive tap weights using a zero force adaptive algorithm.

Implementations may include one or more of the following features. The known user data signal may include known bit values determined by the channel circuit during a prior read operation. The channel circuit may include a soft output bit detector configured to determine bit values from the equalized read data signal, where the known bit values comprise bit values based on output of the soft output bit detector. The circuit may include an iterative decoder configured to determine data values from the equalized read data signal based on error correction codes, where the known bit values comprise bit values based on output of the iterative decoder. The residue data signal may be based on filtering the equalized read data signal to subtract an equalization target. The channel circuit may include: an equalization target filter configured to determine the equalization target based on the known user data signal and a set of equalization target tap weights; residue auto-correlation logic configured to determine residue correlations based on current tap weights for the set of equalization target tap weights; and matrix computation logic configured to calculate new tap weights for the set of equalization tap weights based on the residue correlations. The channel circuit may include re-equalization logic configured to equalize the residue data signal to unity prior to residue correlations being determined by the residue auto-correlation logic. The adjustment logic may be further configured to use a least mean squared adaptive algorithm based on the read data signal to determine the set of adaptive tap weights. The adjustment logic may be further configured to include a weighting factor to determine a first contribution of the zero force adaptive algorithm and a second contribution of the least mean squared adaptive algorithm to determine the set of adaptive tap weights. A data storage device may include the channel circuit and may include a non-volatile storage medium configured to store data.

Another general aspect includes a method that includes: determining, based on a read data signal, a known user data signal determined during a prior read operation; determining, based on residue values from an equalized read data signal, a residue data signal; determining, based on the known user data signal and the residue data signal, a set of adaptive tap weights for an equalization filter using a zero force adaptive algorithm; receiving, by the equalization filter, the read data signal; filtering, by the equalization filter, the read data signal based on the set of adaptive tap weights; and outputting the equalized read data signal.

Implementations may include one or more of the following features. The known user data signal may include known bit values determined during the prior read operation. The method may include determining, by a soft output bit detector, bit values from the equalized read data signal, where known bit values may include bit values based on output of the soft output bit detector. The method may include determining, by an iterative decoder, data values from the equalized read data signal based on error correction codes, where the known bit values may include bit values based on output of the iterative decoder. The method may include filtering the equalized read data signal through an equalization target filter to determine the residue data signal. The method may include: determining an equalization target for the equalization target filter based on the known user data signal and a set of equalization target tap weights; determining residue correlations based on current tap weights for the set of equalization target tap weights and the residue data signal; and calculating new tap weights for the set of equalization tap weights based on the residue correlations. The method may include equalizing the residue data signal to unity prior to residue correlations being determined. The method may include using a least mean squared adaptive algorithm based on the read data signal to determine the set of adaptive tap weights. The method may include: determining a weighting factor for the zero force adaptive algorithm and the least means squared adaptive algorithm; determining, based on the weighting factor, a first contribution of the zero force adaptive algorithm to determine the set of adaptive tap weights; and determining, based on the weighting factor, a second contribution of the least mean squared adaptive algorithm to determine the set of adaptive tap weights.

Still another general aspect includes a data storage device that includes: a non-volatile storage medium; a channel circuit including a read channel and an equalization filter; means for determining, based on a read data signal, a known user data signal determined during a prior read operation; means for determining, based on residue values from an equalized read data signal, a residue data signal; means for determining, based on the known user data signal and the residue data signal, a set of adaptive tap weights for the equalization filter using a zero force adaptive algorithm; means for filtering, by the equalization filter, the read data signal based on the set of adaptive tap weights; and means for outputting the equalized read data signal for use by the read channel to determine user data.

The present disclosure describes various aspects of innovative technology capable of improving manufacturing costs, performance, and/or error rates by supporting improved read signal equalization in the read channel based on zero force equalization. The various embodiments include operations and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve data storage device cost and performance, such as by using the known data signal from a prior read operation to adapt the equalization filter tap weights based on a zero force adaptation algorithm. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Prior zero force (ZF) equalization has involved a two step process. First, the unequalized isolated pulse response (ISO)

is extracted from the waveform using a correlation technique with the data pattern. Then, the ISO response, which is considered noiseless, may be used to construct an equalizer to a desired equalization target based on a matrix equation. This technique may work but is difficult and/or expensive to implement in hardware and is not continuously adaptive.

In data storage and retrieval, adaptive ZF equalization has been directed at the read side and used receiver equalization techniques in a finite impulse response (FIR) filter. However, by viewing the equalizer as operating on the transmission (write) side of the data signal, a different approach may be used. While this approach is not physically possible for data storage and retrieval (e.g., magnetic saturation recording in an HDD), it may provide a mathematical frame work for more cost-effectively and adaptively achieving zero force equalization by using decoded user data (either tentatively determined by a soft output Viterbi algorithm (SOVA) detector or fully decoded by an iterative error correction code (ECC) decoder) as the noiseless input to the equalization filter.

Prior LMS adaptive techniques use tap gradients in an FIR filter based on the correlation of two noisy terms, such as the unequalized read signal and calculated noise residue. This may be represented by:

$$\Delta T_i = \sum -Atten * UnEQ_{k+i} * Residue_k$$

Where $\Delta T_i$ is the tap gradient, Atten is the attenuation value, $UnEQ_{k+i}$ is the unequalized input signal, and $Residue_k$ is the noise residue value. The unequalized input signal and the noise residue value are both noisy terms and the correlation based on signal and on noise may result in misequalization.

The proposed adaptive ZF technique uses tap gradients based on the correlation of one noiseless term, a signed signal value corresponding to 1 and 0 values (e.g., encoded as a signed signal (−1, +1)) corresponding to bit determinations made on previously equalized read data signals, and one noisy term (noise residue value). This may be represented by:

$$\Delta T_i = \sum -Atten * \text{Signed}_{k+i} * Residue_k$$

Where $\text{Signed}_{k+i}$ is the signed signal value from previously determined bit decisions. There is only correlation based on signal and not on noise, which may result in proper ZF adaptation.

Figure 3:
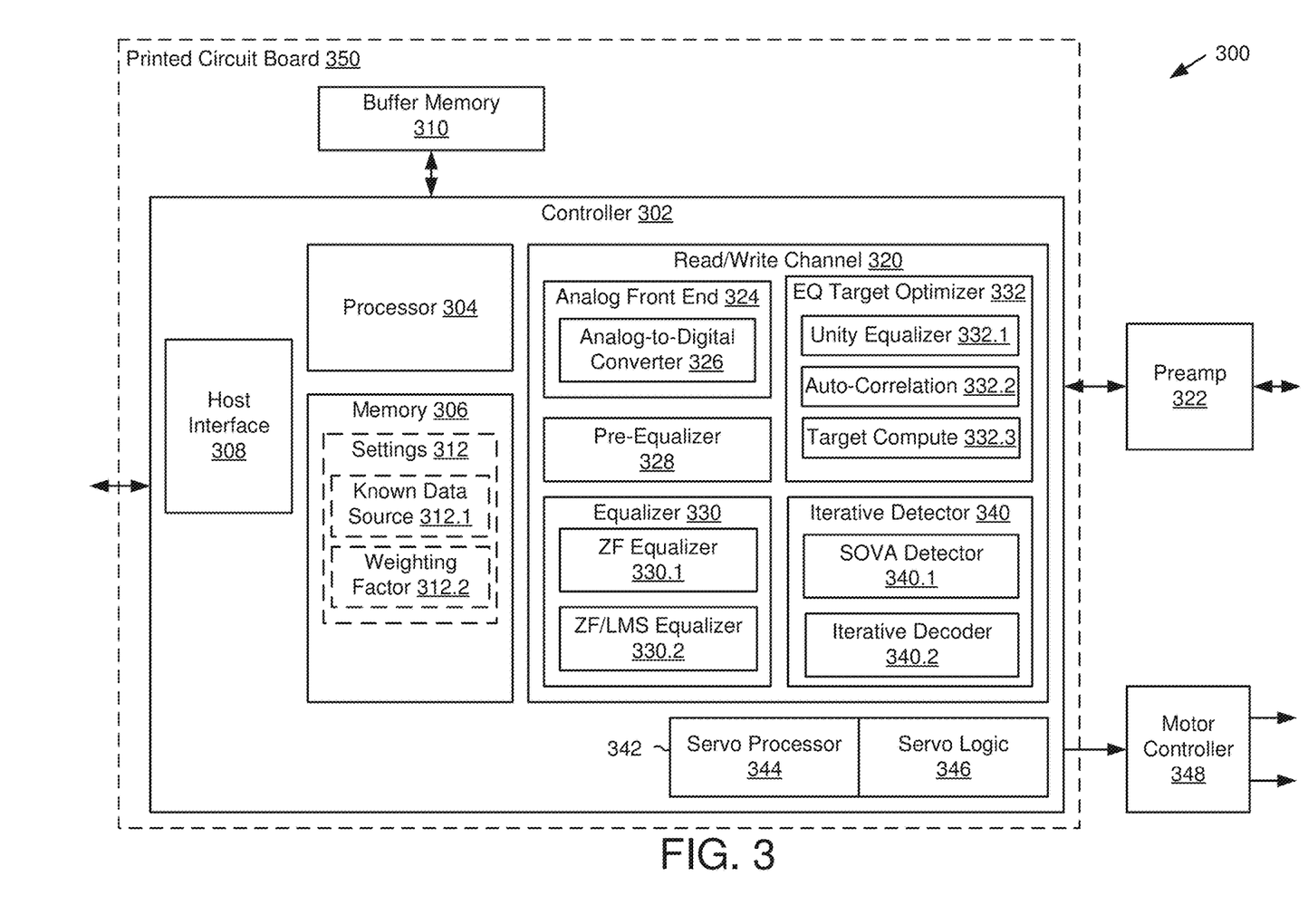
FIG. 3 is a block diagram of a configuration of data storage device electronics for a controller and read/write channel configured with a zero force equalizer.

FIG. 3 shows a portion of example control circuitry 300 for a data storage device, such as a hard disk drive. In the example shown, control circuitry 300 may include one or more controllers. Controller 302 may comprise a storage device controller configured to receive host storage commands, process storage operations for writing, reading, and managing data stored to non-volatile storage media in the disk drive, such as the magnetic media disks in FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise at least one processor 304, at least one memory 306, at least one host interface 308, and access to at least one buffer memory 310. Controller 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions, and may include a plurality of processors operating alone or in combination. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may include multiple memory packages and/or memory types operating alone or in combination. Memory 306 may be configured to store controller firmware, comprising instructions that include one or more modules or sub-modules for specific data storage device operations and processor 304 may execute those instructions, including controlling communication with other components, such as host interface 308, buffer memory 310, read/write channel 320, and servo controller 342. In some configurations, one or more features of host interface 308, buffer memory 310, read/write channel 320, and/or servo controller 342 may be embodied in firmware stored in memory 306 for execution by processor 304.

In some configurations, memory 306 may be used to store one or more modules for execution during the manufacture, configuration, and/or operation of the storage device. For example, settings 312 may be used to configure one or more components of read/write channel 320 to support ZF equalization, such as equalizer 330 and/or equalization target optimizer 332. In some configurations, settings 312 may include one or more stored configuration parameters for determining hos read/write channel 320 operates. For example, settings 312 may be embodied in a configuration page or similar data structure in memory 306. In other configurations, settings 312 may be embodied in hardware through one or more switches or registers that are controlled or populated by firmware in memory 306. For example, known data source 312.1 may include a switch in read/write channel 320 that determines whether the known data source used by equalizer 330 is selected from the initial bit output of SOVA detector 340.1 or the decoded bit output of iterative decoder 340.2. In some configurations, weighting factor 312.2 may include a parameter value that determines the relative weight of ZF and LMS adaptation algorithms where equalizer 330 uses combined equalization. Settings 312 may be further described below with regard to the circuits or logic for implementing equalizer 330 and/or equalization target optimizer 332.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path or write channel comprised of various data scramblers, run-length limited (RLL) encoders, iterative error correction code (ECC) encoders, precompensation circuits, and other data or signal processing components. Read/write channel 320 may include a read path or read channel comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware and decoded data from read/write channel 320 may be passed to controller firmware and/or directed to buffer memory 310 for communication to the host.

In some configurations, read/write channel 320 may include an analog front end 324 configured to receive the analog read signal from preamp 322 and convert it into a digital read signal for processing by other components of read/write channel 320. For example, analog front end 324 may include an ADC 326 that receives an analog data signal from preamp 322 and generates a digital signal for use by other components of read/write channel 320. ADC 326 may sample the analog read signal at a predefined channel baud rate to determine digital signal values corresponding to a digital read signal waveform. In some configurations, analog front end 324 may include an ADC buffer memory configured to temporarily store the digital read signal generated by the ADC before it passed to other components, such as pre-equalizer 328 and/or equalizer 330 in the read path to iterative detector 340.

In some configurations, read/write channel 320 may include pre-equalizer 328. Pre-equalizer 328 may include a signal processing circuit that precedes equalizer 330 in the read path of read/write channel 320 and may include a filter configured to reduce the size of equalizer 330. For example, pre-equalizer 328 may be configured with a fixed set of tap weights that reduce a non-varying portion of the signal equalization and thereby reduce the operating range needed for equalizer 330. Once the tap weights for pre-equalizer 328 are determined they may be adapted less frequently than equalizer 330, while reducing the hardware and/or time necessary for equalizer 330 to adapt to operating read data signals.

Figure 5:
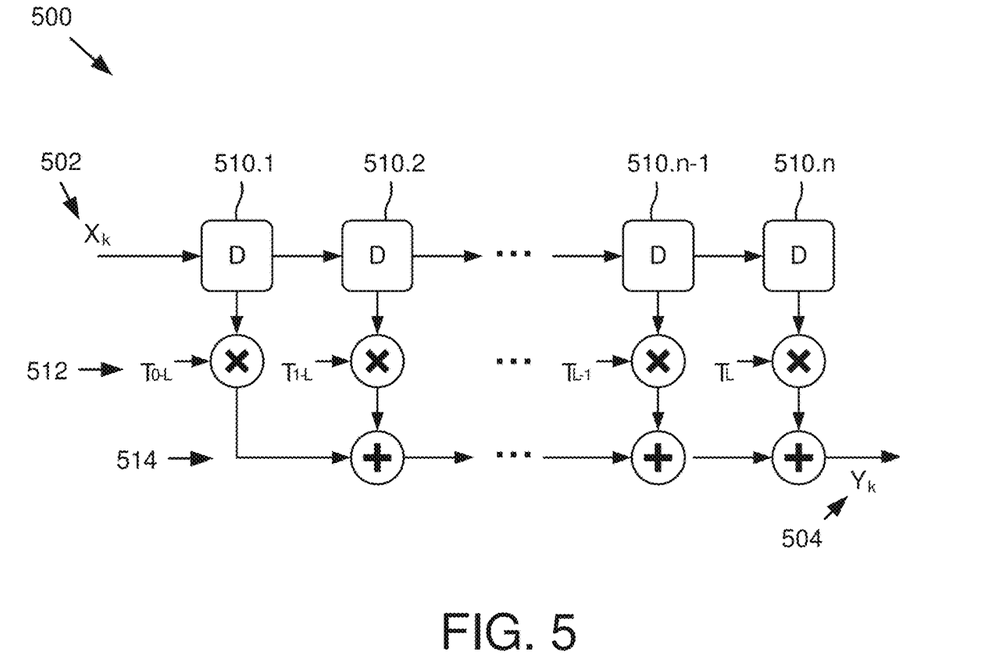
FIG. 5 is a block diagram of example filter configurations for an equalizer circuit.

In some configurations, read/write channel 320 may include equalizer 330. Equalizer 330 may include an equalization circuit and/or corresponding hardware and firmware configured to equalize the digital read data signal prior to processing by iterative detector 340. For example, equalizer 330 may receive a digital read signal from ADC 326 directly or through one or more other signal processing components, such as pre-equalizer 328, and output an equalized read data signal to one or more other components in the read path, such as iterative detector 340. In some configurations, equalizer 330 may be configured as a partial response filter, such as a finite impulse response filter, controlled by a series of tap weights that determine how an incoming read data signal will be filtered to the equalized read data signal. An example filter configuration is shown in FIG. 5. Equalizer 330 may include tap adjustment logic configured to adapt the tap weights of the equalizer filter.

In some configurations, equalizer 330 may include a ZF equalizer circuit 330.1 as tap adjustment logic configured to adapt the tap weights based on a zero force adaptive algorithm. For example, ZF equalizer circuit 330.1 may receive the read data signal, a known data signal (e.g., signed bit signal from prior detection/decoding of read data) for that read data signal, and a residue value for the read data signal after equalization through the current tap weights of equalizer 330 and corresponding to the difference between the equalized read data signal and an equalization target. ZF equalizer circuit 330.1 may apply a zero force adaptive algorithm to determining changes to the set of tap weights based on the inputs. For example, ZF equalizer circuit 330.1 may implement an adaptive algorithm in the general form of:

$$\sum -Atten * \text{Signed}_{k+i} * \text{Residue}_k$$

The configuration and operation of ZF equalizer circuit 330.1 may be further described below with regard to FIG. 4A.

In some configurations, equalizer 330 may include a combined ZF/LMS equalizer circuit 330.2 as tap adjustment logic configured to adapt the tap weights based on a combination of a zero force adaptive algorithm and an LMS adaptive algorithm. For example, ZF/LMS equalizer circuit 330.2 may receive the read data signal, a known data signal (e.g., signed bit signal from prior detection/decoding of read data) for that read data signal, and a residue value for the read data signal after equalization through the current tap weights of equalizer 330 and corresponding to the difference between the equalized read data signal and an equalization target. A zero force adaptive algorithm may operate substantially as described above for ZF equalizer 330.1 to generate a ZF portion of the tap weight adjustments, while the LMS adaptive algorithm may implement an adaptive algorithm in the general form of:

$$\Delta T_i = \sum -Atten * UnEQ_{k+i} * Residue_k$$

to generate an LMS portion of the tap weight adjustments. In some configurations, the relative contributions of the two adaptive algorithms may be determined by a weighting factor, such as weighting factor 312.2. The resulting adaptive algorithm may be in the general form of:

$$\Delta T_i = \sum -Atten * ((p * Signed_{k+i}) + ((1-p) * UnEQ_{k+i})) * Residue_k$$

The weighting factor p determines the relative contributions of the ZF term based on the known bit data signal and the LMS term based on the unequalized input read data signal. In some configurations, read/write channel 320 may include an equalization target optimizer 332. Equalization target optimizer 332 may include logic and/or a circuit for periodically determining the equalization (EQ) target used to determine the residue term or signal for adapting equalizer 330. The optimal EQ target may be based on minimizing, as well as orthogonalizing, the noise residue after the equalizer. Read/write channel 320 may operate based on a current EQ target during read operations and equalization target optimizer 332 may be initiated periodically to determine or adjust the EQ target to a new EQ target from the current EQ target and resulting noisy residue values/signal. In some configurations, the current EQ target may be represented by a filter and corresponding set of equalization tap weights and the current EQ target (values corresponding to those tap weights) may be used as an input to EQ target optimizer 332 for determining changes to the tap weights representing a new EQ target. The residue terms from prior operation of equalizer 330 (using the current EQ target) may be used as input to EQ target optimizer 332. In some configurations, equalization target optimizer 332 may use a combination of unity equalizer 332.1, auto-correlation logic 332.2, and target compute logic 332.3 to generate parameters for a new EQ target, such as a set of tap weights used for filtering the equalized data signal to determine the noisy residue signal. Equalization target optimizer 332 may operate "offline" to periodically recalibrate the optimal EQ target based on a set of recently read data and corresponding noise residue, rather than attempting real-time adjustment of the EQ target.

In some configurations, equalization target optimizer 332 may re-equalize the current equalizer residue to a unity target without inter-symbol interference (ISI) using unity equalizer 332.1 or similar re-equalization logic. For example, unity equalizer 332.1 may generate unity non-ISI equalized noise residue that corresponds to the colored noise from the unity equalization target. Re-equalizing to unity may simplify further calculation of the optimal EQ target based on measures of noise statistics. For example, the unity noise residue may be used to adapt an adaptive equalization target filter, such as the 3-tap filter shown in FIG. 6, to find optima tap coefficients that whiten the composite output noise. Re-equalization to unity may allow EQ target optimizer 332 to use an adaptive gradient method from the unity equalization to avoid matrix calculation or use residue auto-correlation logic 332.2 and a simplified matrix (compared to using the current EQ targets without re-equalization). For example, auto-correlation logic 322.2 may be simplified to use a 2×2 matrix and simplified matrix computation logic for $R_{xx}(\tau)$=residue auto-correlation in the general form of:

$$\begin{bmatrix} R_{xx}(0) & R_{xx}(1) \\ R_{xx}(1) & R_{xx}(0) \end{bmatrix} \begin{bmatrix} T_1 \\ T_2 \end{bmatrix} = \begin{bmatrix} -R_{xx}(1) \\ -R_{xx}(2) \end{bmatrix}$$

Figure 6:
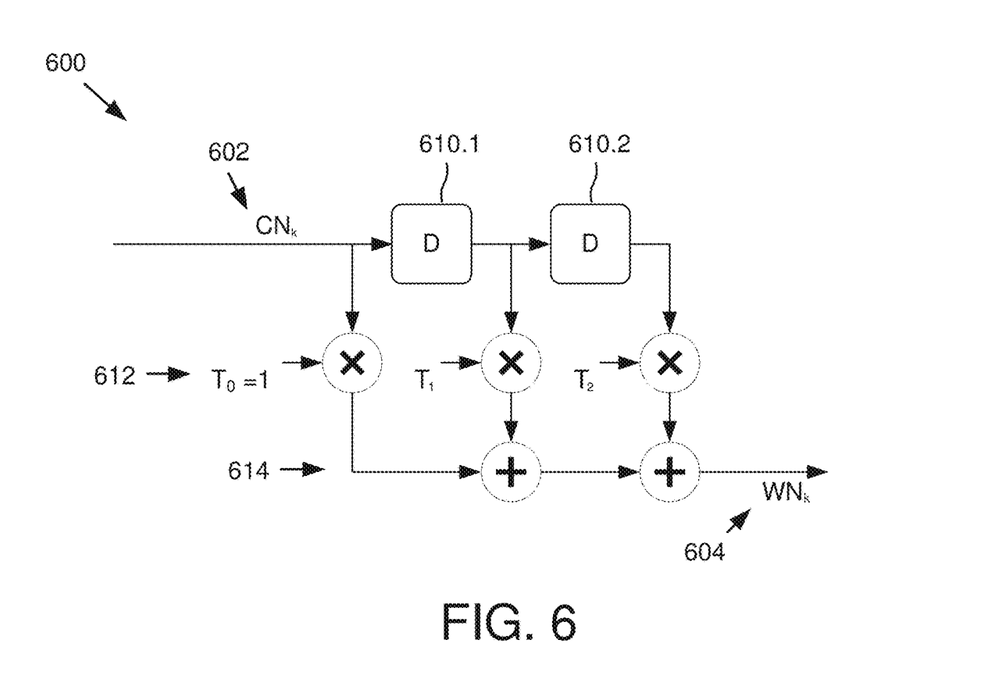
FIG. 6 is a block diagram of an example filter configuration for an equalization target circuit.

$T_0$ equals 1 and the changes in tap weights (see example filter configuration in FIG. 6) may be adapted using:

$$\Delta T_i = \sum -Atten * CN_{k+i} * WN_k$$

Where $CN_k$ is the colored noise residue from the current EQ target and unity non-ISI equalization target and $WN_k$ is a composite noise resultant from being equalized to the new optimized equalization target. An output set of tap weights for configuring the equalization target used by equalizer 330 may be generated from the adaptive gradient method or residue auto-correlation after unity by target compute logic 332.3.

In some configurations, equalization target optimizer 332 may not re-equalize to unity, measure noise statistics, and use auto-correlation matrix 332.2 based on a larger scale matrix calculation. For example, the noise residue signal from equalized read data signals may generate direct noise statistics across a range of possible tap weight correlations. A larger-scale auto-correlation matrix may be processed using matrix computation logic to determine adjustments to the EQ target tap weights. For example, $R_{xx}(\tau)$ may equal residue in auto-correlation, $R_{yy}(\tau)$ may equal residue out auto-correlation, and $R_{tt}(\tau)$ may equal the current EQ tap auto-correlation. The resulting matrix calculations may be based on the general form of:

$$[R_{tt}(\tau) \text{ convolutional matrix}] * [R_{yy}(\tau)] = [R_{xx}(\tau)]$$

$R_{yy}(\tau)$ may use the same unity matrix calculation shown above with regard to the unity re-equalized approach. The convolutional matrix may be solved based on the residue in and residue out correlations to determine tap weight changes for an optimized EQ target relative to the current EQ target.

In some configurations, read write channel 320 may include an iterative detector 340 configured to receive read data from the read heads and use iterative bit detection and ECC processing to decode the received read data into decoded data for further processing by controller firmware and/or communication to the host. For example, iterative detector 340 may include one or more bit detectors 324.1, such as soft output Viterbi algorithm (SOVA) detectors, and one or more iterative decoders 324.2, such as low density parity check (LDPC) decoders operating on multi-bit encoded symbols to decode each sector of data received by read/write channel 320. Iterative detector 340 may receive a digital read signal from ADC 326 in analog front end 324. In some configurations, iterative detector 340 may determine, with varying levels of accuracy or certainty, the recorded bits in the read data signal corresponding to user data. For example, bit detector 324.1 may output soft information predicting the most likely bit value for each bit position in the read data signal and iterative decoder 324.2 may output a completely decoded data sector after iterative processing that corresponds to the bit values for each bit position in the read data signal for the sector. As described above, either of these sets of known data may be used to generate a known data signal that represents the channel's determination (interim or final) of each bit value. For example, a known data signal may map 1s and 0s from the user data to +1 and −1 values corresponding to the noiseless signal value for the corresponding read data.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 322 and provided to servo controller 342. Servo controller 342 may provide servo control signals to motor controller 348 and motor controller 348 may control one or more actuator VCMs and/or a spindle motor for rotating the disk stack.

Figure 4A:
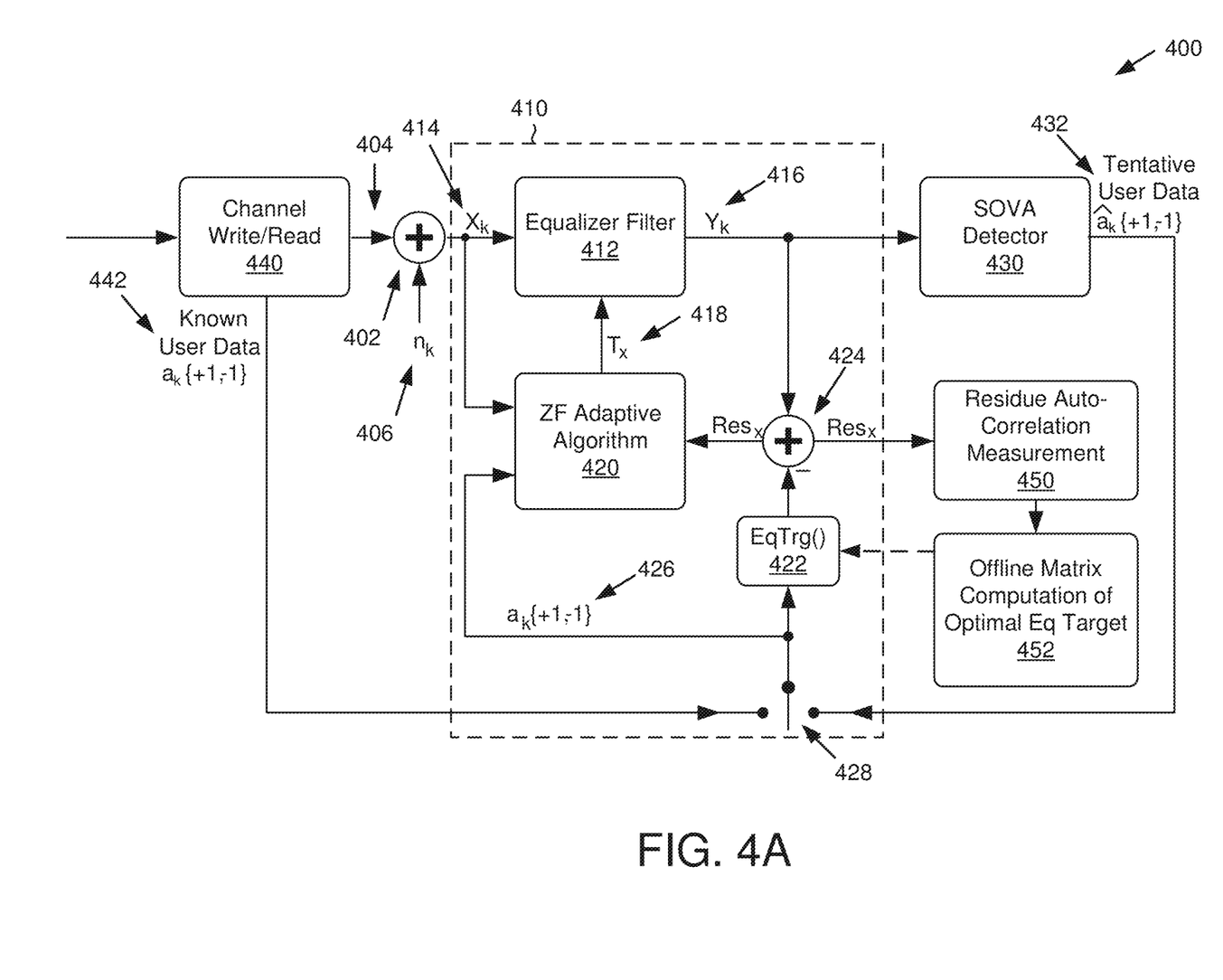
FIG. 4A is a block diagram of a portion of an example channel circuit with a zero force equalizer.

FIG. 4A shows an example configuration of data storage device electronics 400 for a read/write channel configured with an equalizer circuit 410 using a ZF adaptive algorithm as described above and EQ target optimization without equalization to unity. Note that these two features need not be used together and are shown as part of the same electronics 400 for ease of description. Equalizer circuit 410 may be configured with an equalizer filter 412 that receives a read data signal 414 ($X_k$), such as the digital read data signal from an ADC in the read path of the data storage device, and outputs an equalized read data signal 416 ($Y_k$) for further processing by the read channel, such as processing by SOVA detector 430 and other components of an iterative data detector. k may represent a sequence of bit positions and corresponding values in one or more data signals. Read data signal 414 may be a combination 402 of user data signal 404 and a corresponding noise component 406 ($n_k$). Equalizer circuit 410 may be configured to eliminate as much of noise component 406 as possible to assist SOVA detector 430 and other components of the read/write channel in correctly identifying the data component of read data signals 414.

In some configurations, equalizer filter 412 comprises a set of taps in a partial response filter for modifying read data signal 414. The current set of tap weights for equalizer filter 412 determines the filtering to equalize read data signal 414. Equalizer circuit 410 may include ZF adaptive algorithm logic 420 for dynamically adapting tap weights 418 ($T_x$) of equalizer filter 412. For example, each time ZF adaptive algorithm logic 420 processes a set of inputs it may output updated tap weights 418 (as a set of tap weights or tap weight changes relative to a prior set of tap weights) to adapt operation of equalizer filter 412. ZF adaptive algorithm logic 420 may receive a residue signal 424 ($Res_x$) and a known data signal 426 for determining changes in tap weights 418. Known data signal 426 provides a noiseless term for zero force adaptation and residue signal 424 provides the noisy term to be reduced by adapting tap weights 418. For example, known data signal 426 may comprise bit values $a_k(+1, -1)$ determined from prior operation of the read/write channel to determine bit values from the equalized read data signal. Residue signal 424 may comprise a noisy residue signal leftover from filtering or subtracting an equalization target 422 (EqTrg( )) (corresponding to known data signal 426) from equalized read data signal 416. In some configurations, ZF adaptive algorithm logic 420 may also receive read data signal 414.

In some configurations, ZF adaptive algorithm logic 420 may use known data signal 426 from a plurality of sources within the read channel. For example, known data signal 426 may be received from SOVA detector 430 as tentative user data 432. SOVA detector 430 or a similar bit detector may process the equalized read signal through a Viterbi matrix to determine the most likely sequence of bit values in the read signal and calculate related soft information describing the likelihood of the bits in that pattern. The initial bit sequence identified by SOVA detector 430 may be generated relatively quickly after the read data signal has been equalized and, therefore, may provide more rapid feedback for adapting the tap weights of equalization filter 412. However, those bit values are tentative and may be modified by further processing through an iterative decoder, such as an LDPC decoder, for making a final read determination of the bit sequence in equalized read data signal 416. The full operation of channel write and read 440 may generate a more reliable set of known user data 442 and, in some configurations, ZF adaptive algorithm logic 420 may use known user data 442 as the noiseless input term for ZF adaptation of tap weights 418. For example, channel write/read 440 operation may generate a fully decoded sector of data with bit values validated through the iterative ECC process that may then be used as known data signal 426. In some configuration, equalization circuit 410 may include a multiplexor or switch 428 for switching between the different sources of known data signals, such as tentative user data 432 and known user data 442. The selection and corresponding processing delay between known data sources may be based on the rate of adaptation and/or the reliability of the adaptation and it may be desirable to switch sources for different operating periods and/or conditions (such as increasing error rates) over the life of the data storage device. In some configurations, equalization target 422 may also be based on convolving the known data values 426 as an input with the tap weights of an equalization target filter for determining residue signal 424. Switch 428 may also be used to select between the known data sources for operating residue determinations for ZF adaptive algorithm logic 420 and/or residue determinations used for noise auto-correlation to update equalization target 422.

In some configurations, electronics 400 may include logic for updating equalization target 422. For example, residue signal 424 may be received by residue auto-correlation measurement logic 450 to measure noise terms associated with each bit position in equalized read data signal 416 for a sample of data. Residue auto-correlation measurement logic 450 may determine the noise metrics associated with the received residue signal 424. The noise metrics may then be used for offline matrix computation of an optimal equalization target. For example, a matrix based on the current equalization target tap values may be evaluated using the resulting noise metrics to determine correlations that would improve the equalization target. Tap weight changes may be determined from the matrix computation and be used to modify the tap weights of the equalization target filter of equalization target 422.

Figure 4B:
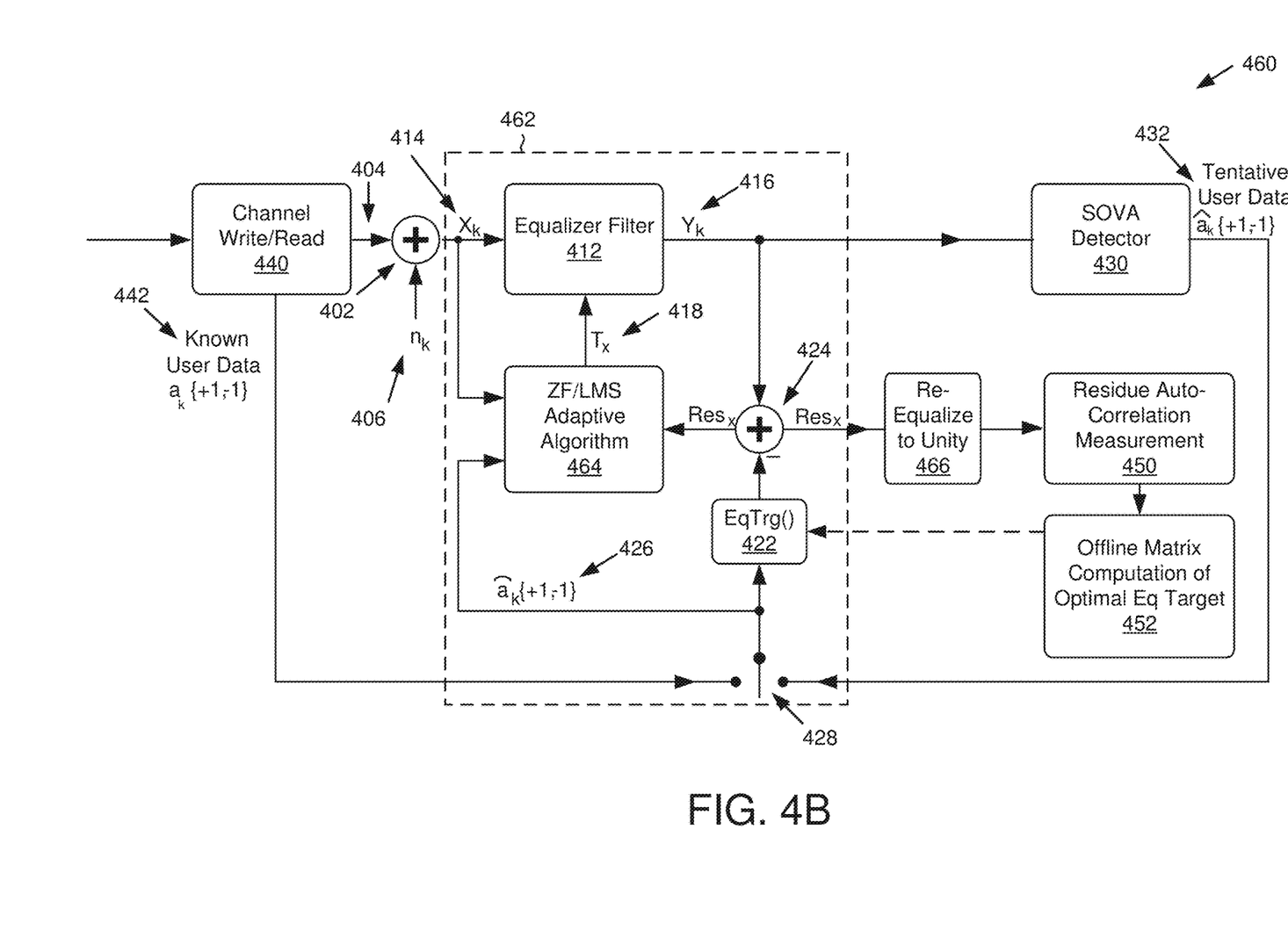
FIG. 4B is a block diagram of a portions of another example channel circuit with a combined zero force and LMS equalizer and alternative optimal equalization target.

FIG. 4B shows another example configuration of data storage device electronics 460 for a read/write channel configured with an equalizer circuit 462. This version of equalizer circuit 462 includes ZF/LMS adaptive algorithm logic 464 that uses a combination of a ZF adaptive algorithm and an LMS adaptive algorithm. Additionally, electronics 460 includes re-equalize to unity logic 466 configured to re-equalize residue signal 424 to unity prior to processing through residue auto-correlation measurement 450 and offline matrix computation of optimal EQ target logic 452. As mentioned regarding FIG. 4A, these features may be combined or used separately, but are shown together in electronics 460 for ease of description.

In some configurations, equalizer circuit 462 may include ZF/LMS adaptive algorithm logic 464 configured for dynamically adapting tap weights 418 of equalizer filter 412. ZF/LMS adaptive algorithm 464 may receive read data signal 414, residue signal 424, and a known data signal 426 for determining changes in tap weights 418. Read data signal 414 may be input to an LMS term of the ZF/LMS adaptive algorithm. Known data signal 426 may be input to a ZF term of the ZF/LMS adaptive algorithm. Residue signal 424 may provide the residue term to be reduced through the tap weight adjustments. As described above, ZF/LMS adaptive algorithm 464 may be configured with a weighting factor for determining the relative contributions of the ZF and LMS adaptive algorithm terms to adapting tap weights 418.

In some configurations, electronics 460 may include re-equalize to unity logic 466 to pre-process residue signal 424 for determination of adjustments to equalization target 422. As described above, re-equalizing residue signal 424 to unity (1 or 0) reduces the variability of noise metrics and simplifies further processing to determine tap weight adjustments for equalization target 422. In some configurations, not shown, re-equalize to unity 466 may support an adaptive gradient method to determine changes to equalization target 422 without offline matrix computation 452. In the configuration shown, re-equalized residue signal 424 may be used for residue auto-correlation measurement 450 and simplified offline matrix computation 452. Regardless of method, new tap weights or changes to tap weights may be provided to an equalization target filter to update equalization target 422 in equalization circuit 462 responsive to periodic optimization of the equalization target based on a set of operating read data and prior performance of equalizer circuit 462.

FIG. 5 shows an example equalizer filter 500, such as may be used in equalizer circuits 410 and 462 in FIGS. 4A and 4B. Equalizer filter 500 may receive unequalized read data signal 502 ($X_k$), process the received signal through an FIR filter configuration, and output equalized read data signal 504 ($Y_k$). Equalizer filter 500 may include a delay line comprised of a series of delay circuits 510.1-510.n for a filter length (L) and corresponding number of taps (n). Each delay 510 may have a corresponding tap filter 512 and associated tap weight value ($T_{0-L}$-$T_L$). As discussed above, the set of adaptive tap weights for tap filters 512 may be adapted during operation of the equalizer circuit using a ZF adaptive algorithm or a combined ZF/LMS adaptive algorithm. Summation line 514 combines the signals through each delay 510 and tap filter 512 to determine equalized read data signal 504.

FIG. 6 shows an example EQ target filter 600, such as may be used in equalizer circuits 410 and 462, to determine the residue signal from the equalized read data signal. EQ target filter 600 may receive the colored noise signal 602 ($CN_k$) from the current equalization filter and referenced to a unity non-ISI equalization target and corresponding residual noise, process the received signal through an FIR filter configuration (e.g., a 3-tap FIR filter), and output a whitened noise signal 604 ($WN_k$) or whitened composite noise resultant from being equalized to the new equalization target. EQ target filter 600 may include a delay line comprised of a series of delay circuits 610.1-610.2 for a filter length and corresponding number of taps (3). EQ target filter 600 may include a tap 0 with a tap weight of 1 that passes the input signa to summation line 614. Each delay 610 may have a corresponding tap filter 612 and associated tap weight value ($T_1$-$T_2$). As discussed above, the set of adaptive tap weights for tap filters 612 may be modified during operation of the equalizer circuit using offline calculation of updated tap weights for improving the optimal equalization target. The tap weights may be convolved with the known data values in the signal (corresponding to bit values 0 or 1) to determine the equalization target values to be filtered from the equalized read data signal. Summation line 614 combines the signals through each delay 610 and tap filter 612 to determine residue signal 604.

Figure 7:
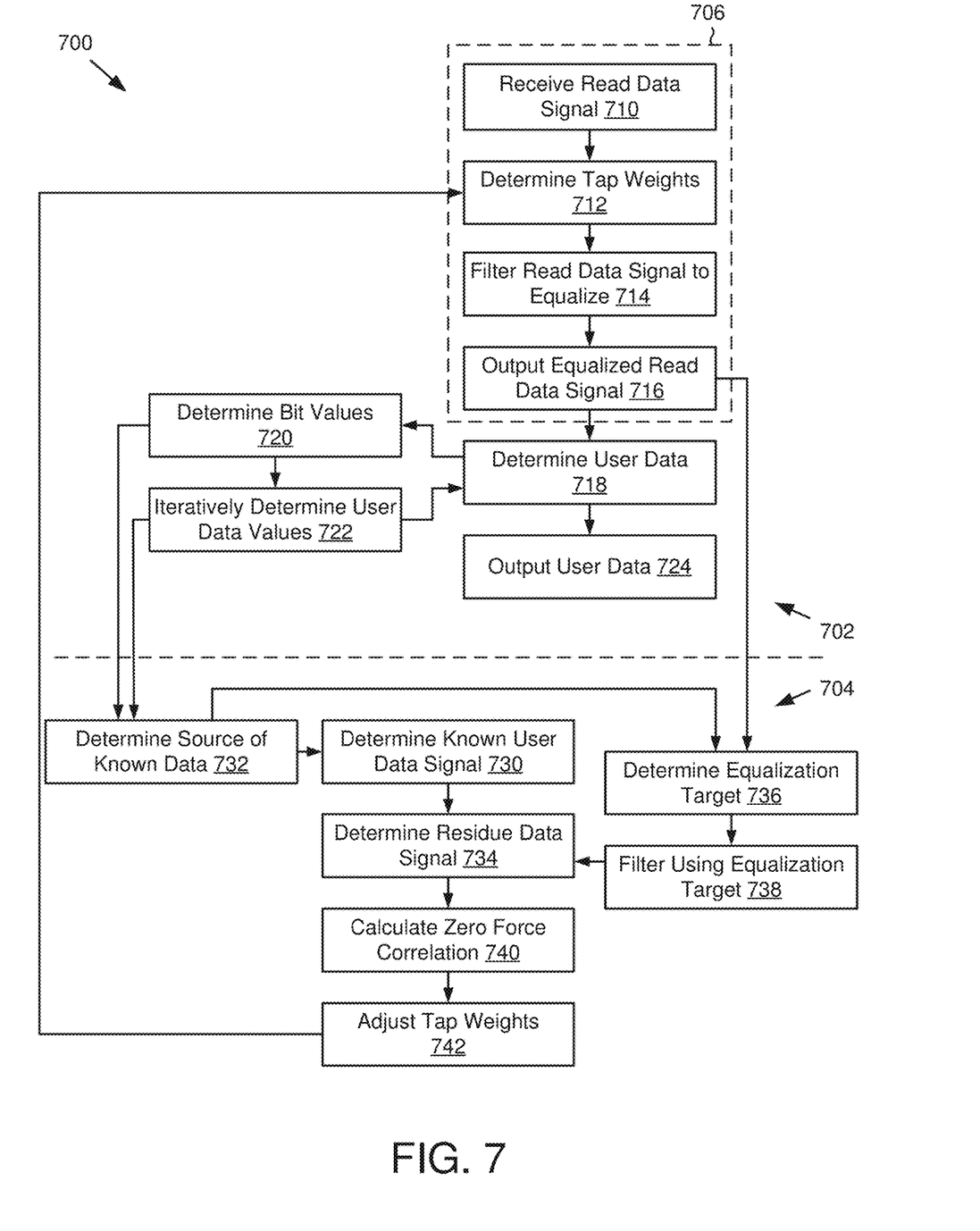
FIG. 7 is an example method of using and adjusting a zero force equalizer in a read channel.

As shown in FIG. 7, control circuitry 300 and/or electronics 400 or 460 may be operated according to an example method 700 of using and adjusting a zero force equalizer in a read channel. In some configurations, blocks 702 may be executed during read operations by a data storage device to equalize the read data signal and blocks 704 may be selectively executed to adapt the equalizer circuit using zero force equalization based on prior or in-process read operations that produce known data with which to evaluate operation of the equalizer. In some configurations, blocks 706 and/or blocks 704 may be executed by an equalizer circuit.

At block 710, a read data signal may be received. For example, the equalizer circuit may receive the digital read data signal from the ADC in the analog front end of a read/write channel.

At block 712, tap weights may be determined. For example, the equalizer circuit may include an equalizer filter configured with a set of tap weights determined from previously processed read data and adapted according to blocks 704.

At block 714, the read data signal may be filtered to equalize the read data signal. For example, the read data signal may pass through the equalizer filter to equalize the read data signal based on the set of tap weights determined at block 712.

At block 716, an equalized read data signal may be output. For example, the equalizer circuit may output the equalized read data signal for use in determining user data from the read data signal.

At block 718, user data may be determined from the read data signal. For example, the read/write channel may include and iterative detector for determining the bit data values in the read data signal. In some configurations, user data may be determined according to blocks 720 and 722.

At block 720, tentative bit values may be determined. For example, a bit detector, such as a SOVA detector, may determine most likely bit values for a sequence of bit positions in the read data signal and return soft information related to the possible bit values in the read data signal.

At block 722, user data values may be iteratively determined. For example, an iterative decoder, such as an LDPC decoder, may determine the user data encoded in the read data signal based on the soft information output from the bit detector and using iterative ECC processing for sequences of read data, such as codewords or sectors.

At block 724, user data may be output. For example, the read channel may return the user data for a data sector to data storage device firmware and/or a host requesting the data.

At block 730, a known user data signal may be determined. For example, the equalizer circuit may include tap adjustment logic that receives a known user data signal based on prior or ongoing read processing through the read channel.

At block 732, a source of known user data may be determined. For example, the tap adjustment logic may include a switch or multiplexor for determining whether tentative bit values determined at block 720 or final bit values determined at block 722 are used for the known user data signal.

At block 734, a residue data signal may be determined. For example, the tap adjustment logic may receive a residue data signal based on the noisy residue remaining after processing the read data signal through the equalizer circuit in blocks 706. In some configurations, the residue data signal may be determined blocks 736 and 738.

At block 736, an equalization target may be determined. For example, the equalization target may include a filter that convolves the known bit value with tap weights representing an ideal read data signal.

At block 738, the equalized read data signal may be filtered using the equalization target. For example, the equalized read data signal may pass through the equalization target filter to generate a data signal corresponding to the noisy remainder of the equalized read data signal after the ideal read data signal is removed.

At block 740, zero force correlation may be calculated. For example, the tap adjustment logic may use a zero force adaptive algorithm to process the known user data signal and the residue data signal to determine new tap weights or tap weight changes.

At block 742, the tap weights for the equalizer filter may be adjusted. For example, the tap adjustment logic may feed the tap weight changes back to the equalization filter to adjust the tap weights for the next read data to be processed.

Figure 8:
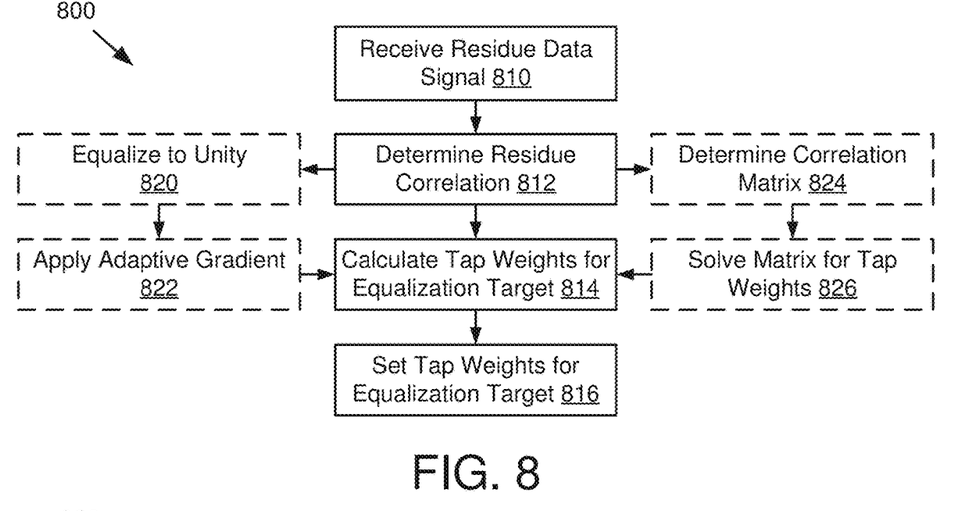
FIG. 8 is an example method of determining an optimal equalization target with alternative configurations.

As shown in FIG. 8, control circuitry 300 and/or electronics 400 or 460 may be operated according to an example method 800 of determining an optimal equalization target with alternative configurations. In some configurations, blocks 820-822 may use equalization to unity and an adaptive gradient algorithm to avoid matrix calculations in determining an updated equalization target. In some configurations, blocks 824-826 may use a correlation matrix from the residue data signal to determine updated tap weights for the equalization target.

At block 810, a residue data signal may be received. For example, equalization target optimizer logic may receive residue data calculated from prior read operations and an existing set of EQ target tap weights.

At block 812, residue correlation may be determined. For example, the equalization target optimizer logic may calculate noise metrics from the residue data based on correlations with the current EQ target tap weights.

At block 814, tap weights may be calculated for the equalization target. For example, based on the correlations in the noise metrics, the equalization target optimizer logic may determine changes in the tap weights to improve performance of the equalizer based on a more optimal EQ target.

At block 816, the tap weights for the equalization target may be set. For example, the equalization target optimizer logic may send the updated tap values or tap value changes to modify the tap weights of the equalization target filter.

At block 820, the residue data signal may be equalized to unity. For example, the equalization target optimizer logic may re-equalize the residue data signal to unity prior to determining noise metrics and correlations.

At block 822, an adaptive gradient algorithm may be applied. For example, the equalization target optimizer logic may use the re-equalized residue data and existing tap weights to determine changes to the tap weights that reduce the noisy residue.

At block 824, a correlation matrix may be determined. For example, the equalization target optimizer logic may determine a correlation matrix for the existing tap weights and resulting residue data.

At block 826, the matrix may be solved for updated tap weights. For example, the equalization target optimizer logic may use sets of auto-correlations to solve for tap weights that reduce the noisy residue.

Figure 9:
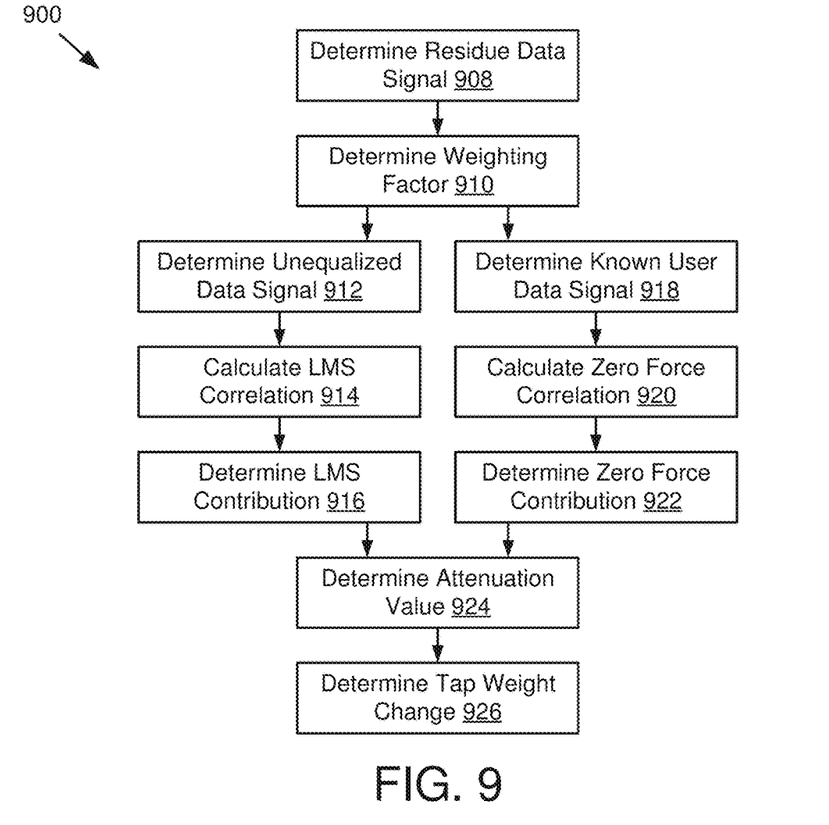
FIG. 9 is an example method of adjusting tap weights of an equalizer using a combined zero force and LMS adaptive algorithm or circuit.

As shown in FIG. 9, control circuitry 300 and/or electronics 460 may be operated according to an example method 900 of adjusting tap weights of an equalizer using a combined zero force and LMS adaptive algorithm or circuit. Blocks 912-916 may determine an LMS portion of the adaptive algorithm and blocks 918-922 may determine a zero force portion of the adaptive algorithm.

At block 908, a residue data signal may be determined. For example, the tap adjustment logic may receive residue data from subtracting an equalization target for the known data signal from the equalized read data signal to determine the noise component that remains after equalization.

At block 910, a weighting factor may be determined. For example, the tap adjustment logic may be configured with or access a weighting factor value that determines the relative contribution of the zero force and LMS terms of the adaptive algorithm.

At block 912, an unequalized read data signal may be received. For example, the tap adjustment logic may use the read data signal prior to processing through the equalizer.

At block 914, an LMS correlation may be determined. For example, the tap adjustment logic may use correlations between the read data signal and the residue data signal to calculate one or more tap adjustments.

At block 916, contribution of the LMS portion of the adaptive algorithm may be determined. For example, the tap adjustment logic may use the weighting factor determined at block 910 to scale the tap adjustments determined by the LMS correlations at block 914.

At block 918, a known user data signal may be determined. For example, the tap adjustment logic may receive known bit values determined by the read channel processing equalized data signals.

At block 920, a zero force correlation may be calculated. For example, the tap adjustment logic may use correlations between the known data signal and the residue data signal to calculate one or more tap adjustments.

At block 922, contribution of the zero force portion of the adaptive algorithm may be determined. For example, the tap adjustment logic may use the weighting factor determined at block 910 to scale the tap adjustments determined by the zero force correlations at block 920.

At block 924, an attenuation value may be determined. For example, the tap adjustment logic may be configured with an attenuation value to control the rate at which the tap values may be adjusted.

At block 926, tap weight changes may be determined. For example, the tap adjustment logic may determine the actual tap adjustments values to be applied to the equalization filter taps based on the weighted LMS and zero force terms and the attenuation and residue values.

Technology for using zero force adaptation based on known data signals for hardware-efficient adaptive equalization in a channel circuit is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. In some configurations, multiple processors and/or memory elements may be used alone or in combination to execute and/or store the program code.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A channel circuit, comprising:
an equalizer filter configured to:
  receive a read data signal;
  filter the read data signal based on a set of adaptive tap weights; and
  output an equalized read data signal; and
adjustment logic configured to:
  receive a known user data signal and a residue data signal, wherein the known user data signal comprises known bit values determined by the channel circuit during a prior read operation; and
  determine the set of adaptive tap weights using a zero force adaptive algorithm.

2. The channel circuit of claim 1, further comprising:
a pre-equalizer circuit configured to filter the read data signal based on a fixed set of tap weights prior to the equalizer filter receiving the read data signal.

3. The channel circuit of claim 1, further comprising:
a soft output bit detector configured to determine bit values from the equalized read data signal, wherein the known bit values comprise bit values based on output of the soft output bit detector.

4. The channel circuit of claim 1, further comprising:
an iterative decoder configured to determine data values from the equalized read data signal based on error correction codes, wherein the known bit values comprise bit values based on output of the iterative decoder.

5. The channel circuit of claim 1, wherein the residue data signal is based on filtering the equalized read data signal to subtract an equalization target.

6. The channel circuit of claim 5, further comprising:
an equalization target filter configured to determine the equalization target based on the known user data signal and a set of equalization target tap weights;
residue auto-correlation logic configured to determine residue correlations based on current tap weights for the set of equalization target tap weights; and
matrix computation logic configured to calculate new tap weights for the set of equalization tap weights based on the residue correlations.

7. The channel circuit of claim 6, further comprising:
re-equalization logic configured to equalize the residue data signal to unity prior to residue correlations being determined by the residue auto-correlation logic.

8. The channel circuit of claim 1, wherein the adjustment logic is further configured to use a least mean squared adaptive algorithm based on the read data signal to determine the set of adaptive tap weights.

9. The channel circuit of claim 8, wherein the adjustment logic is further configured to include a weighting factor to determine a first contribution of the zero force adaptive algorithm and a second contribution of the least mean squared adaptive algorithm to determine the set of adaptive tap weights.

10. A data storage device comprising the channel circuit of claim 1 and further comprising a non-volatile storage medium configured to store data.

11. A method comprising:
determining, based on a read data signal, a known user data signal determined during a prior read operation;
determining, based on residue values from filtering an equalized read data signal through an equalization target filter, a residue data signal;
determining, based on the known user data signal and the residue data signal, a set of adaptive tap weights for an equalization filter using a zero force adaptive algorithm;
receiving, by the equalization filter, the read data signal;
filtering, by the equalization filter, the read data signal based on the set of adaptive tap weights; and
outputting the equalized read data signal.

12. The method of claim 11, wherein the known user data signal comprises known bit values determined during the prior read operation.

13. The method of claim 12, further comprising:
determining, by a soft output bit detector, bit values from the equalized read data signal, wherein the known bit values comprise bit values based on output of the soft output bit detector.

14. The method of claim 12, further comprising:
determining, by an iterative decoder, data values from the equalized read data signal based on error correction codes, wherein the known bit values comprise bit values based on output of the iterative decoder.

15. The method of claim 11, further comprising:
filtering, prior to the equalization filter receiving the read data signal, the read data signal through a pre-equalizer circuit comprising a fixed set of tap weights.

16. The method of claim 11, further comprising:
determining an equalization target for the equalization target filter based on the known user data signal and a set of equalization target tap weights;
determining residue correlations based on current tap weights for the set of equalization target tap weights and the residue data signal; and
calculating new tap weights for the set of equalization tap weights based on the residue correlations.

17. The method of claim 16, further comprising:
equalizing the residue data signal to unity prior to residue correlations being determined.

18. The method of claim 11, further comprising:
using a least mean squared adaptive algorithm based on the read data signal to determine the set of adaptive tap weights.

19. The method of claim 18, further comprising:
determining a weighting factor for the zero force adaptive algorithm and the least means squared adaptive algorithm;
determining, based on the weighting factor, a first contribution of the zero force adaptive algorithm to determine the set of adaptive tap weights; and
determining, based on the weighting factor, a second contribution of the least mean squared adaptive algorithm to determine the set of adaptive tap weights.

20. A data storage device comprising:
a non-volatile storage medium;
a channel circuit including a read channel and an equalization filter;
means for determining, based on a read data signal, a known user data signal determined during a prior read operation;

means for determining, based on residue values from an equalized read data signal, a residue data signal;
means for determining a set of adaptive tap weights for the equalization filter using a weighted combination of:
   a zero force adaptive algorithm based on the known user data signal and the residue data signal; and
   a least mean squared adaptive algorithm based on the read data signal;
means for filtering, by the equalization filter, the read data signal based on the set of adaptive tap weights; and
means for outputting the equalized read data signal for use by the read channel to determine user data.

21. A data storage device, comprising:
a non-volatile storage medium configured to store data; and
a channel circuit comprising:
   an equalizer filter configured to:
      receive a read data signal generated from the data stored on the non-volatile storage medium;
      filter the read data signal based on a set of adaptive tap weights; and
      output an equalized read data signal; and
   adjustment logic configured to:
      receive a known user data signal and a residue data signal, wherein the residue data signal is based on filtering the equalized read data signal to subtract an equalization target; and
      determine the set of adaptive tap weights using a zero force adaptive algorithm.

* * * * *